United States Patent [19]

Bartlett et al.

[11] Patent Number: 5,532,284
[45] Date of Patent: Jul. 2, 1996

[54] POLYMER FOAMS CONTAINING GAS BARRIER RESINS

[75] Inventors: Philip L. Bartlett; Joseph A. Creazzo, both of Wilmington; Howard S. Hammel, Bear, all of Del.

[73] Assignee: E. I. Du Pont de Nemours and Company, Wilmington, Del.

[21] Appl. No.: 390,911

[22] Filed: Feb. 17, 1995

Related U.S. Application Data

[63] Continuation of Ser. No. 882,247, May 8, 1992, abandoned, which is a continuation of Ser. No. 500,050, Mar. 23, 1990, abandoned.

[51] Int. Cl.$^6$ .................................................. C08G 18/14
[52] U.S. Cl. .................. 521/134; 521/131; 521/137; 521/142; 521/155
[58] Field of Search ....................... 521/134, 131, 521/137, 142, 155

[56] References Cited

U.S. PATENT DOCUMENTS

| | | | |
|---|---|---|---|
| 3,222,304 | 12/1965 | Ingram | 260/2.5 |
| 3,344,221 | 8/1968 | Moody et al. | 521/143 |
| 3,984,597 | 10/1976 | Haack et al. | 428/220 |
| 4,075,139 | 2/1978 | Greer | 521/131 |
| 4,119,584 | 10/1978 | Papa et al. | 521/136 |
| 4,156,703 | 5/1979 | Harrop | 521/134 |
| 4,243,717 | 1/1981 | Gahmig | 428/402 |
| 4,251,584 | 2/1981 | Engelen et al. | 428/159 |
| 4,283,500 | 8/1981 | Armstrong et al. | 521/137 |
| 4,359,539 | 11/1982 | Hoki et al. | 521/79 |
| 4,370,378 | 1/1983 | Zabrocki et al. | 521/134 |
| 4,379,859 | 4/1983 | Hirosawa et al. | 521/134 |
| 4,427,795 | 1/1984 | Dorrestijn et al. | 521/134 |
| 4,515,407 | 5/1985 | McCullough et al. | 521/139 |
| 4,515,907 | 5/1985 | McCullough et al. | 521/134 |
| 4,572,865 | 2/1986 | Gluck et al. | 428/309 |
| 4,636,529 | 1/1987 | Crooker | 521/131 |
| 4,640,933 | 2/1987 | Park | 521/134 |
| 4,663,361 | 5/1987 | Park | 521/94 |
| 4,694,026 | 9/1987 | Park | 521/134 |
| 4,694,027 | 9/1987 | Park | 521/134 |
| 4,789,690 | 12/1988 | Milovanovic-Lerik et al. | 521/137 |
| 4,795,763 | 1/1989 | Gluck et al. | 521/99 |
| 4,894,395 | 1/1990 | Park | 521/134 |
| 4,898,893 | 2/1990 | Ashida | 521/131 |
| 4,927,863 | 5/1990 | Bartlett et al. | 521/131 |
| 4,931,484 | 6/1990 | Hovis et al. | 521/143 |
| 4,945,119 | 7/1990 | Smits et al. | 521/131 |
| 4,972,002 | 11/1990 | Volkert | 521/120 |
| 4,972,003 | 11/1990 | Grunbauer et al. | 521/131 |
| 4,997,706 | 3/1991 | Smits et al. | 428/304 |
| 5,001,164 | 3/1991 | Smits et al. | 521/131 |
| 5,032,623 | 7/1991 | Keske et al. | 521/131 |

FOREIGN PATENT DOCUMENTS

| | | |
|---|---|---|
| 990900 | 6/1976 | Canada . |
| 0001807 | 5/1979 | European Pat. Off. . |
| 0001791 | 5/1979 | European Pat. Off. . |
| 0024324 | 3/1981 | European Pat. Off. . |
| 0305084 | 3/1989 | European Pat. Off. . |
| 88849 | 12/1960 | France . |
| 2144983 | 2/1973 | France . |
| 54-159680 | 12/1979 | Japan . |
| 59-062664 | 4/1984 | Japan . |
| 60-110733 | 6/1985 | Japan . |
| 1025914 | 4/1966 | United Kingdom . |
| 2034322 | 6/1980 | United Kingdom . |

OTHER PUBLICATIONS

"A Fundament Study of the Thermal Conductivity Ageing of Rigid PUR Foam . . . " Cunningham et al. 32nd Annual Polurethane Technical/Marketing Conf., Oct. 1–4, 1989 pp. 56–62.

"Permeation Studies For HCFC In Rigid Polyurethane Foams" Du Pont brochure Dec. 1989.

* Copy of 88849 reference is not attached. However, a copy of the English equivalent 1,079,256 is attached.

Dishart, Grazzo, and Ascough; The Dupont Program of Fluorocarbon Alternative Blowing Agents for Polyurethane Foams, Polyurethane World Congress, Oct. 1987.

Dishart, Creazzo, and Ascough; The DuPont Program on Fluorocarbon Alternative Blowing Agents for Polyurethane Foams; Polyurethane World Congress, 1987—Sep.—Oct.

*Primary Examiner*—Nathan M. Nutter
*Assistant Examiner*—John M. Cooney, Jr.
*Attorney, Agent, or Firm*—Michael K. Boyer

[57] ABSTRACT

An improved closed cell polymer foam and foaming agent involving the use of a halocarbon blowing agent (e.g., HCFC-22, HCFC-123, HCFC-123a, and HCFC-141b) in combination with an effective amount of a gas barrier resin (e.g., an ethylene/vinyl acetate copolymer, ethylene/acrylic ester copolymer or acrylic ester polymer) uniformly dispersed in the continuous polymeric phase. The presence of the gas barrier resin is shown to significantly reduce the escape of blowing agent from and/or entry of air into the foam resulting in low thermal conductivity over a longer period of time and improved thermal insulation value.

15 Claims, No Drawings

POLYMER FOAMS CONTAINING GAS BARRIER RESINS

This is a continuation, of application Ser. No 07/882,247 filed May 8, 1992, now abandoned, which is a continuation of Ser. No. 07/500,050 filed on Mar. 23, 1990, abandoned.

BACKGROUND OF THE INVENTION

1. Field of the Invention

This invention relates to improved polymer foams which contain a gas barrier resin. More specifically, the invention relates to closed cell polymer foams containing a gas barrier resin uniformly dispersed in the continuous polymeric phase which reduces air permeation into the foam and/or loss of halocarbon from the cells of the foam and thereby maintains low thermal conductivity and improved thermal insulation value of the foam.

2. Description of Related Art, including Information Disclosed under §§1.97–1.99

It is generally known and an accepted commercial practice to add a blowing agent to various polymeric materials during fabrication such as to produce a cellular (expanded foam) material. Typically, the blowing agent can be either a reactive solid or liquid that evolves a gas, a liquid that vaporizes, or a compressed gas that expands during final fabrication producing the desired polymeric foam. Such foams are categorically either closed cell (i.e., non-porous, continuous polymer phase with discontinuous gas phase dispersed therein) or open cell (porous) foams which are advantageously employed in various end use applications and exhibit various advantages associated with the particular type of foam produced. In describing the closed cell foam as involving a discontinuous gas phase, it should be appreciated that this description is an over simplification. In reality the gas phase is dissolved in the polymer phase and there will be a finite substantial presence of gas (blowing agent) in the polymer. Furthermore and as generally known in the art, the cell gas composition of the foam at the moment of manufacture does not necessarily correspond to the equilibrium gas composition after aging or sustained use. Thus, the gas in a closed cell foam frequently exhibits compositional changes as the foam ages leading to such known phenomenon as increase in thermal conductivity or loss of insulation value.

Closed cell foams are usually employed for their reduced thermal conductivity or improved thermal insulation properties. Historically, insulating polyurethane and polyisocyanurate foams have been made using trichlorofluoromethane, $CCl_3F$ (CFC-11), as the blowing agent. Similarly, insulating phenolic foam is known to be made from phenol-formaldehyde resins (typically via an intermediate resole mixture involving a phenol-formaldehyde oligomer condensate) using blends of 1,1,2-trichlorotrifluoroethane, $CCl_2FCClF_2$ (CFC-113), and CFC-11 as the blowing agent. Also, insulating thermoplastic foam such as polystyrene foam is commonly manufactured using dichlorodifluoromethane, $CCl_2F_2$ (CFC-12), as the blowing agent.

The use of a chlorofluorocarbon as the preferred commercial expansion or blowing agent in insulating foam applications is in part based on the resulting k-factor (i.e., the rate of transfer of heat energy by conduction through one square foot of one inch thick homogenous material in one hour where there is a difference of one degree Fahrenheit perpendicularly across the two surfaces of the material) associated with the foam produced. Thus, it is generally known and accepted that a chlorofluorocarbon gaseous phase within the closed cell is a superior thermal barrier relative to other inexpensive gases such as air or carbon dioxide. Conversely, the natural intrusion of air into the foam over time and to a lesser extent the escape of the chlorofluorocarbon from the cell is deleterious to the desired low thermal conductivity and high insulative value of the foams. Also, the escape of certain chlorofluorocarbons to the atmosphere is now recognized as potentially contributing to the depletion of the stratospheric ozone layer and contributing to the global warming phenomenon. In view of the environmental concerns with respect to the presently employed chlorofluorocarbon blowing agents, it is now generally accepted that it would be more desirable to use hydrochlorofluorocarbons or hydrofluorocarbons rather than the chlorofluorocarbons. Consequently, the need for a method or way of inhibiting the permeation of air and blowing agent through the polymer phase of the polymeric foam exists and ideally any such solution to the problem would be effective in inhibiting the permeation of commercially available halocarbon blowing agents as well as the proposed alternative halocarbons.

Historically, various methods and compositions have been proposed, with varying degree of success, to alleviate and/or control problems associated with permeation of gases into and out of polymeric foams. For example, in U.S. Pat. No. 4,663,361 the problem of shrinkage (lack of dimensional stability) associated with using any blowing agent other than 1,2-dichlorotetrafluoroethane in the manufacture of foamed polyethylene is addressed. In this reference, a stability control agent is used in either a homopolymer or copolymer of ethylene wherein the blowing agent is isobutane or isobutane mixed with another hydrocarbon or a chlorocarbon, fluorocarbon or chlorofluorocarbon. The stability control agent is either partial esters of long chain fatty acids with polyols, higher alkyl amines, fatty acid amides, olefinically unsaturated carboxylic acid copolymers, or polystyrene. This reference also describes other prior art and is included by reference for such purpose.

In U.S. Pat. No. 4,243,717 a Fischer-Tropsch wax is added to expanded polystyrene beads to produce a stable cell structure in the foam, without specific reference to the permeation of blowing agent or air. In Canadian Patent 990,900 the use of a barrier material or blocking agent is disclosed to alleviate the problem of gas migration through the cell wall specifically at the time of foaming. The particular problem addressed in this Canadian patent is the rupture and total collapse of the cell walls that frequently occur in the manufacture of closed cell polyethylene foam. This problem is attributed to the fact that the cell walls for such foams are permeable to the rapidly expanding gas under the influence of the heat liberated by the exothermic polymer crystallization. The specific solution disclosed in this reference is to use a blend of and along with a barrier resin such as an elastomer containing polystyrene or acrylic resin which are intended to contribute high melt strength to the cell wall at the foaming temperature. An inert nucleant is also employed along with at least two gaseous propellants of substantially different vapor pressures.

In U.S. Pat. No. 4,795,763 the use of at least 2 percent carbon black as a filler uniformly dispersed in a polymeric foam is shown to reduce the aged k-factor of the foam to below the aged k-factor of the corresponding unfilled foam.

SUMMARY OF THE INVENTION

The present invention provides a method of preventing or slowing down the rate of intrusion or permeation of air into the closed cells of a polymeric foam as well as preventing or slowing down the rate of migration or permeation of the blowing agent out of the polymer foam cells. According to the present invention the effective rate of permeation of air and/or halocarbon across the polymeric phase of the foam is substantially reduced by virtue of the presence of a gas barrier resin. The gas barrier resin is capable of dramatically reducing the permeation rate of the gaseous blowing agent, in particular, a hydrogen-containing blowing agent, thus retaining it in the foam. The presence of the gas barrier resin also functions to reduce entry of air into the polymer foam. By reducing the entry of air into insulating foam and/or reducing the permeation of blowing agents out of insulating foam, the gas barrier resins according to the present invention produce foams which better maintain their insulating characteristics relative to foams made without these agents.

Thus, the present invention provides in a closed cell thermoplastic or thermoset polymer foam characterized by a continuous polymeric phase and a discontinuous gaseous phase, the improvement comprising: an effective amount of a gas barrier resin substantially uniformly dispersed in the continuous polymeric phase to reduce the permeation of gas therethrough. Preferably the gas barrier resin is present in the range of from about 0.1 to about 20 weight percent based on the total weight of foam and most preferably from about 0.5 to about 10 weight percent.

The improved method according to the present invention involves, in a process for manufacturing an insulating polymer foam wherein a blowing agent is admixed with a molten thermoplastic or a liquid thermoset resin precursor and allowed to expand forming a polymer foam as the polymeric phase solidifies, the improvement comprising the step of: dispersing in the molten thermoplastic or liquid thermoset resin precursor an effective amount of a gas barrier resin prior to expansion such that the gas barrier resin is substantially uniformly dispersed in the resulting polymeric phase of the polymer foam.

It is an object of the present invention to provide a gas barrier resin that when incorporated into a polymeric foam will reduce or prevent the intrusion of air into the foam and/or the escape of blowing agent from the foam. It is a further object of the present invention to provide such a gas barrier resin that is particularly useful with the chlorofluorocarbons, hydrogen-containing chlorofluorocarbons and hydrogen-containing fluorocarbons (i.e., the CFCs, HCFCs and HFCs), thus significantly reducing their rate of permeation and escape from a closed cell polymer foam. It is an associated object of the present invention to provide insulating foam containing a gas barrier resin and a method of manufacturing the same that exhibits preservation of the insulating properties over longer periods of times relative to the absence of the blocking agent. Fulfillment of these objects and the presence and fulfillment of additional objects will be apparent upon complete reading of the specification and the claims.

DESCRIPTION OF THE PREFERRED EMBODIMENTS

Polymer foams typically involve a continuous or at least a contiguous phase in a cellular structure. This cellular structure can be either flexible or rigid and is categorically either an open cell structure (i.e., the individual cells are ruptured or open producing a soft, porous "sponge" foam which contains no blowing agent gas) or a closed cell structure (i.e., the individual cells contain blowing agent gas surrounded by polymeric sidewalls with minimum cell-to-cell gas flow). Thermally insulating foams are closed cell structures containing a blowing agent gas (i.e., a gas formed in situ during the foam manufacturing process). Preferably the blowing agent gas should have a low vapor thermal conductivity (VTC) so as to minimize conduction of heat through the insulating foam. Thus, the vapor thermal conductivities for halocarbons such as CFC-11, CFC-12 and hydrochlorodifluoromethane, $CHClF_2$ (HCFC-22), at 25° C. (i.e., 45.1, 55.7 and 65.9 $Btu.ft^{-1}.hr^{-1}.°F.^{-1} \times 10^4$ respectively) compare favorably to the VTC for air at 25° C. (i.e., 150.5 $Btu.ft^{-1}.hr^{-1}.°F.^{-1} 10^4$). From these data, it can readily be seen that the presence of a halocarbon blowing agent is required for optimum thermal insulation properties with both thermoplastic and thermoset foams.

A problem with hydrogen-containing alternative blowing agent HCFC-22 is its rapid migration from thermoplastic foams. For example, in the case of one grade of polystyrene, the permeation rate at 25° C. for CFC-12 vs. HCFC-22 was $4.2 \times 10^{-9}$ g/hr vs. $6.5 \times 10^{-8}$ g/hr (i.e., HCFC-22 permeated 15.5 times faster than CFC-12). Without some way to prevent or slow down the rate of HCFC-22 permeation from polystyrene foam, this blowing agent is unacceptable for producing good insulation foam, using this particular grade of polystyrene.

HCFC-22 is also known to permeate rapidly from some polyurethane/polyisocyanurate foam formulations. Techniques for slowing/preventing this blowing agent migration are required if the halocarbon is to be useful in preparing these thermoset insulating foams.

In addition to the undesirable degradation of foam insulation value caused by permeation losses of blowing agent, the effect of the air entry from the atmosphere into the foam cells is at least equally significant. As air enters the foam cells, the vapor thermal conductivity of the cell gas increases and the insulation value drops.

The gas barrier resins of this invention unexpectedly function to reduce air entry into foams and/or to reduce the permeation of chlorofluorocarbons and hydrogen-containing halocarbon blowing agents such as HCFC-22 from the foam cells, thereby producing more effective/economical insulating foams.

For the purposes of the present invention, the term "gas barrier resin" is used herein to denote a polymer which when incorporated into insulating foams reduces permeation of air and/or gaseous blowing agents as measured by standard procedures such as permeation tests and insulation value tests.

The gas barrier resins of the present invention reduce the permeation of CFCs (e.g., trichlorofluoromethane ($CCl_3F$, CFC-11), dichlorodifluoromethane ($CCl_2F_2$, CFC-12), 1,1,2-trifluorotrichloroethane ($CCl_2FCClF_2$, CFC-113), and 1,1,2,2-tetrafluorodichloroethane ($CClF_2CClF_2$, CFC-114)); HCFCs (e.g., HCFC-22, 1,1,1-trifluoro- 2,2-dichloroethane ($CHCl_2CF_3$, HCFC-123), 1,1,2-trifluoro-1,2-dichloroethane ($CHClFCClF_2$, HCFC-123a), 1,1,1,2-tetra-fluoro- 2-chloroethane ($CHClFCF_3$, HCFC-124), 1,1-dichloro-1-fluoroethane ($CCl_2FCH_3$, HCFC-141b), and 1-chloro-1,1-difluoroethane ($CClF_2CH_3$, HCFC-142b)}; and HFCs (e.g., dihydrodifluoromethane ($CH_2F_2$, HFC-32), pentafluoroethane ($CHF_2CF_3$, HFC-125), 1,1,2,2-tetrafluoroethane ($CHF_2CHF_2$, HFC-134), 1,1,1,2-tetrafluoroethane ($CH_2FCF_3$, HFC-134a), 1,1,1-trifluoroethane ($CF_3CH_3$, HFC-143a), 1,2-difluoroethane ($CH_2FCH_2F$, HFC-152), and 1,1,-difluoroethane ($CHF_2CH_3$, HFC-152a)) through thermoplastic and thermoset polymer foams.

For purposes of the present invention and as previously mentioned, the gas barrier resin can broadly be any compound that when incorporated into insulating foam reduces diffusion of air and/or gaseous blowing agent as reflected in either a permeation or insulation value measurement. Although the actual mechanism of action by which the gas barrier resins of the present invention reduce or minimize the change in foam insulation values and/or gas permeation is not fully known and understood, it is presently felt that the dispersed barrier resins physically block the migration or permeation of air and/or blowing agents, at least in part, because of the relatively poor solubility and diffusivity of these gases in the barrier resins. For example, but not by way of limitation, the following table lists examples of gas barrier resins.

GAS BARRIER RESINS (1) Ethylene/Vinyl Alcohol Copolymers, for example, "SELAR" OH 3007 (manufactured by Du Pont Co.) containing 30 mole % ethylene and with a melting point of 185° C.

(2) Ethylene/Vinyl Acetate Copolymers, for example, "ELVAX" 40 (manufactured by Du Pont Co.) containing 40 weight % vinyl acetate.

(3) Ethylene/Acrylic Ester Copolymers, for example, "VAMAC" G (manufactured by Du Pont Co.) which is an ethylene/methyl acrylate copolymer.

(4) Polyvinyl Alcohol, for example, "ELVANOL" 90-50 (manufactured by Du Pont Co.) 99% hydrolyzed.

(5) Polyacrylonitrile, for example, Polymeric Acrylonitrile Type A-7 (manufactured by Du Pont Co.) containing 6 weight % methyl acrylate.

(6) Polyvinylidene Fluoride, for example, "SOLEF" 1008-1001 (manufactured by Soltex Polymer Corp.).

(7) Polyvinylidene Chloride, for example, "IVAN" PV 880 (manufactured by Soltex Polymer Corp.) which contains some methyl acrylate. Polyvinylidene chloride also is often available as a copolymer with vinyl chloride ("SARAN" 516, Dow Chemical Co.).

(8) Acrylic Ester Polymers, for example, "ELVACITE" 2016 (methyl/butyl methacrylate copolymer) (manufactured by Du Pont Co.).

(9) Polyamide (Nylon), for example, "SELAR" PA 3426 (manufactured by Du Pont Co.).

(10) Ethylene/Vinyl Alcohol Copolymers admixed With Mica, for example, "SELAR" OH 3004 (P3) (manufactured by Du Pont Co.) containing a 77/23 blend of "SELAR" OH ethylene/vinyl alcohol and mica.

The use of the preferred hydrogen-containing blowing agents such as HCFC-22 with the gas barrier resin compounds in polymer foams does not preclude the simultaneous incorporation of other blowing agents. It should be appreciated that the gas barrier resins also reduces the permeation of various CFCs, which may be present as a component of a blowing agent mixture useful according to the present invention and that the present invention is applicable when $CO_2$, hydrocarbons or methyl formate are components of the blowing agent gas.

In addition to reducing the entry of air into and/or the migration of the blowing agents from thermoplastic foams, the gas barrier resins may provide other functions to the foam manufacturing process. For example, gas barrier resins such as ethylene/vinyl alcohol copolymers and polyamides may provide improved strength or load-carrying properties to the foams. These gas barrier resins may also contribute other advantageous properties such as lubricity or plasticization to the foam.

The gas barrier resins of this invention are suitable for use with thermoplastics such as polystyrene, polyethylene, polypropylene, polyvinyl chloride, and the like to prevent loss of halocarbon blowing agents; however, preferably they can also be used with thermoset polymer foams such as polyurethane, polyisocyanurate, and phenolic resin foams. Furthermore, these gas barrier resins will function in the presence of other additives normally used in polymer foams, such as stabilizers, dyes, fillers, and the like.

The blowing agent concentration used to prepare most conventional thermoplastic and thermoset polymer foams is generally in the range of about 5 weight percent to about 30 weight percent (based on total weight of the foam). To reduce migration of halocarbon blowing agents, the effective use concentration of gas barrier resin is at least about 0.1 weight percent and preferably from about 1.0 to 20 weight percent (based on total formulation weight), most preferably about 0.5 weight percent to about 10 weight percent.

The actual method by which the gas barrier resin according to the present invention is to be incorporated into the closed cell foam can vary according to the specific application and composition being employed. In the broadest sense, the gas barrier resin can be treated as any other foam additive as generally known in the art. As previously stated, the gas barrier resin in certain applications imparts beneficial effects to the polymer phase in addition to reducing permeability and in such cases the gas barrier resin can be added to the polymer. However, it is contemplated that it may in certain applications be advantageously added to the blowing agent or preblended into the polymer (e.g., polystyrene) prior to extrusion or other method of fabrication. In the case of thermoset foams (e.g., polyurethane/polyisocyanurate foams) the gas barrier resins can be added to the foam in the isocyanate (A-side) or the polyol (B-side) or added with the blowing agent at the mixing head where the A-side and B-side are combined (i.e., third-streamed). If the gas barrier resin used contains free hydroxyl groups, this must be taken into account when calculating the hydroxyl equivalent for the B-side system. In the case where the gas barrier resin is preferentially more soluble in one of the foam components, it is preferably added to that component. For example, addition of the gas barrier resin to the polyol component of two-component polyurethane/polyisocyanurate system is preferred. Of course, the addition to more than one component or either component is also contemplated. In the case of phenolic foams, the gas barrier resins can be added to the foam by preblending into the resole or added separately at the mixing head prior to the foam laydown. The most preferred method of adding the gas barrier resin, in the case of a phenolic foam, is to mix it with the resole.

The following examples are presented to further illustrate specific critical properties of various specific embodiments of the present invention, including vapor pressure, boiling point and permeation data, as well as similar properties, for comparison purposes, of systems and compositions outside the scope of the invention.

EXAMPLE 1

The thermal conductivity or k-factor (Btu in/hr ft$^{2o}$ F.) was determined for a series of polyisocyanurate foam with and without various gas barrier resins. The measurements of thermal conductivity (k-factor) were according to the ASTM Method C518–85 using a Rapid K instrument manufactured by Holometrix Company. The resulting k-factor data for the polyisocyanurate foams (250 index), blown with CFC-11, containing various gas barrier resins and aged at ambient temperature are presented in Table I.

TABLE I

Thermal conductivity (K-Factor) Data
Foam Polymer: 250 Index Polyisocyanurate*

| Barrier Resin | Wt. % in Foam Polymer** | Days at Ambient Temperature | K-Factor Btu in./hr. ft$^2$ °F. |
| --- | --- | --- | --- |
| None | — | 20 | 0.145 |
| | | 90 | 0.172 |
| | | 200 | 0.181 |
| | | 240 | 0.182 |
| "ELVACITE" 2016 | 5.0 | 40 | 0.121 |
| | | 90 | 0.137 |
| | | 200 | 0.151 |
| | | 240 | 0.151 |
| "SOLEF" 1008-1001 | 10.0 | 47 | 0.122 |
| | | 90 | 0.137 |
| | | 200 | 0.150 |
| "ELVANOL" 90-50 | 10.0 | 110 | 0.150 |
| | | 200 | 0.164 |
| "SELAR" OH 3007 | 10.0 | 110 | 0.152 |
| | | 200 | 0.170 |

*Polyol used was "STEPANOL" PS-2852, equivalent wt. 197 (manufactured by Stepan Co.); polyisocyanate used was PAPI 580, equivalent wt. 136.5 (manufactured by Dow Chemical Co.).
**Foam blown with about 10–11 wt. percent CFC-11.

EXAMPLE 2

The permeation of nitrogen and HCFC-22 through polystyrene film was measured for polymer films with and without a gas barrier resin.

The permeation data was obtained on 15–20 mil thick polystyrene films which were prepared as follows:
(a) Barrier resin and polystyrene were passed through a twin screw extruder three times at 400° F. to ensure good blending of components. The extruder used was a 28 mm Werner and Pfleider, Stuttgart, Model 20S-K-28 twin screw.
(b) After pelletizing the extruded polymer, 15–20 mil thick films (in 6"×6" sheets) were pressed at about 35,000 psig pressure using a Barber-Coleman press.
(c) The 6"×6" sheets of 15–20 mil film were cut into 47 mm diameter circles or discs with a polymer die punch.

Permeation tests were run on polystyrene films containing various gas barrier resins to determine the permeation of air and blowing agents in polystyrene foam. Such film closely simulates polystyrene foam cell walls and the permeation data are predictive of foam blowing agent retention and susceptibility to air intrusion. Studies were made with HCFC-22 and nitrogen (simulating air) as follows:

Polystyrene Film Preparation (A) Mixing Polystyrene/Additives by Extrusion

Samples of polystyrene (2500 grams) plus gas barrier resin were hand mixed and passed through a screw extruder three times at about 400° F. Three passes were used to ensure uniform blending of components. Since (prior to pelletizing) the polymer mixes were extruded into a water tank for cooling, between the passes and after the third extrusion, the pelletized samples were dried about 16 hours in a vacuum oven at 175°–200° F. The extruder used was a 28 mm Werner and Pfleider, Stuttgart, Model 20S-K-28 twin screw.

(B) Film Pressing of Polystyrene/Additive Mixtures

Using a Barber-Coleman press, 30 gram samples of polystyrene/additive mixes (as pellets) were pressed into 6"×6" sheets of film with 15–20 mil thickness. The pressing was done at 400° F. and at a pressure of about 35,000 psig (maintained for 5 minutes).

(C) Film Discs for Permeation Tests

Discs (15–20 mil thickness) were cut from 6×"6" sheets of film. Five discs of 47 mm diameter were made from each sheet. The discs were cut or stamped at ambient temperature using a die punch made of A-2 type steel (hardened).

Permeation Test Procedure

The permeation tests on the polystyrene film containing gas barrier resins were conducted by a modification of ASTM D1434-82, "Standard Method for Determining Gas Permeability Characteristics of Plastic Film and Sheeting". This modified procedure is described in the Master of Chemical Engineering Thesis, P.S. Mukherjee, Widener University, Chester, Pa., February 1988, entitled "A Study of the Diffusion and Permeation Characteristics of Fluorocarbons Through Polymer Films".

Test Conditions (1) All tests were run at a 20 psia pressure differential between the high pressure side and the low pressure side of the permeation cell.

(2) Permeation tests were run at 60° to 120° C., with tests for each gas barrier resin/polystyrene/gas combination being run at two or more temperatures. Data for other temperatures were calculated from the equation:

$$\ln P = \frac{A}{T} + B$$

where P is permeation coefficient, T is ° K. (° C.+273.2) and A and B are constants determined from the permeation coefficients calculated from the following equation:

$$P = \frac{\text{(Rate of Permeation) (Film Thickness)}}{\text{(Film Area) (Pressure drop across film)}}$$

(3) The permeation rates are based on a 1 cm$^2$ by 1 cm thick film with a 1.0 psia pressure drop across the film.

The permeation rate and permeation coefficient data for nitrogen in polystyrene containing gas barrier resins are summarized in Table II. Data for HCFC-22 in polystyrene containing barrier resins are shown in Table III. The units for permeation rate are g/hr and for permeation coefficient are cm$^3$(STP).cm/sec.cm$^2$.cmHg.

TABLE II

Permeation Data
Polymer: Polystyrene* Temperature: 25° C.

| Gas | Barrier Resin | Wt. % in Polystyrene | Permeation Coefficient cm$^3$ gas at STP cm sec cm$^2$ (cm Hg) | Permeation Rate g./hr. | % Change In Permeation Rate |
| --- | --- | --- | --- | --- | --- |
| Nitrogen | None | — | 8.00 × 10$^{-11}$ | 1.86 × 10$^{-9}$ | — |
| Nitrogen | "ELVAX" 40 | 5.0 | 4.06 × 10$^{-11}$ | 9.44 × 10$^{-10}$ | −49.2 |
| Nitrogen | "SELAR" PA 3246 | 5.0 | 3.32 × 10$^{-11}$ | 7.73 × 10$^{-10}$ | −58.4 |

TABLE II-continued

Permeation Data
Polymer: Polystyrene* Temperature: 25° C.

| Gas | Barrier Resin | Wt. % in Poly- styrene | Permeation Coefficient $cm^3$ gas at STP cm sec $cm^2$ (cm Hg) | Permeation Rate g./hr. | % Change In Permeation Rate |
|---|---|---|---|---|---|
| Nitrogen | "ELVACITE" 2016 | 5.0 | $4.84 \times 10^{-11}$ | $1.13 \times 10^{-9}$ | −39.2 |
| Nitrogen | "SELAR" OH 3007 | 5.0 | $3.13 \times 10^{-11}$ | $7.27 \times 10^{-10}$ | −60.8 |
| Nitrogen | Polyacrylo- nitrile A-7 | 5.0 | $3.87 \times 10^{-11}$ | $9.01 \times 10^{-10}$ | −51.6 |
| Nitrogen | "SARAN" 516 | 1.0 | $4.33 \times 10^{-11}$ | $1.01 \times 10^{-9}$ | −45.8 |
| Nitrogen | "ELVANOL" 90-50 | 5.0 | $3.14 \times 10^{-11}$ | $7.30 \times 10^{-10}$ | −60.7 |
| Nitrogen | "SOLEF" 1008-1001 | 5.0 | $4.18 \times 10^{-11}$ | $9.70 \times 10^{-10}$ | −47.8 |

*"DYLENE" 8 polystyrene (Melt Index 6–7), Arco Chemical Co.

TABLE III

Polymer: Polystyrene* Temperature: 25° C.

| Gas | Barrier Resin | Wt. % in Poly- styrene | Permeation Coefficient $cm^3$ gas at STP cm sec $cm^2$ (cm Hg) | Permeation Rate g./hr. | % Change In Permeation Rate |
|---|---|---|---|---|---|
| HCFC-22 | None | — | $5.41 \times 10^{-12}$ | $3.89 \times 10^{-10}$ | — |
| HCFC-22 | "ELVAX" 40 | 5.0 | $1.30 \times 10^{-12}$ | $9.34 \times 10^{-11}$ | −76.0 |
| HCFC-22 | Polyacrylo- nitrile A-7 | 5.0 | $1.13 \times 10^{-12}$ | $8.08 \times 10^{-11}$ | −79.2 |

*"DYLENE" 8 polystyrene (Melt Index 6–7), Arco Chemical Co.

EXAMPLE 3

Permeation tests were run on polyisocyanurate films containing 5.0 wt. % "ELVACITE" 2016 to determine the diffusion of air in polyurethane foam. These films closely simulate polyurethane/polyisocyanurate foam cell walls and the diffusion data are predictive of foam susceptibility to air intrusion. Studies were made with nitrogen (simulating air) as follows:

Polyisocyanurate Film Preparation (A) Film Casting Mold

An open-faced film casting mold was fabricated from ½" thick aluminum plates. This mold consisted of a 14"×14" bottom plate and a top "picture frame" plate with 1" sides, thereby yielding a film casting cavity of 12"×12". Between the top and bottom plates was inserted a 30 mil thick sheet of high density polyethylene, HDPE, (approx. 15"×15"). The HDPE sheet was fastened to the bottom plate with 3M double-sided tape (placed side to side so as to cover the entire bottom) in order to prevent lifting of the HDPE sheet as the solvent evaporated from the polyisocyanurate or phenolic resin films (and the chemical reaction and film curing proceeded). The HDPE liner was used to prevent film sticking to the aluminum mold.

(B) Polyisocyanurate Films

Isocyanate, "ELVACITE" 2016 and ethyl acetate (see Table IV) were blended and the polyol/catalyst system added. After thoroughly mixing the components for approximately 30 seconds, the clear amber solution was poured into the film mold (carefully to avoid forming bubbles with entrapped air). A "LUCITE" cover was placed over the mold to prevent direct air currents disturbing the film cast. After 24 hours at ambient temperature, during which time most of the ethyl acetate evaporated, the film was loosened with a spatula and removed from the mold. The rough edges of the film (approx. ½") were cut off so that the film would lie flat. The semi-dry film was placed between sheets of "MYLAR" (with a sheet of plywood on top to maintain film flatness) and allowed to sit at ambient temperature for 120 hours to dry/cure. At this point, the film was given a final cure at 100° C. for 24 hours in an oven (while being kept flat with plywood sheet). (If the film is not allowed to air-dry for 120 hours prior to curing at 100° C., it will wrinkle or curl instead of being flat/smooth.)

Finally, the polymer film was cut into 47 mm diameter discs for use in the diffusion/permeation studies using a specially fabricated die punch (the film was warmed for 5 minutes at 70° C. prior to stamping so as to avoid cracking).

(C) Permeation Test Procedure

The permeation tests were run on the polyisocyanurate films exactly as previously described for polystyrene films. The data for the permeation tests are presented in Table V. The permeation rates are based on a one $cm^2$ by one cm thick film with a 1.0 psia pressure drop across the film.

TABLE IV

250 Index Polyisocyanurate Resin

| Comment | Equivalent Wt., g. | Wt. Used, g. |
|---|---|---|
| Isocyanate[a] | 136.5 | 25.0 |
| "ELVACITE" 2016 | — | 2.0 |
| Polyester Polyol[b] | 197.0 | 14.4 |
| Catalyst/Surfactant[c] | — | 0.2 |
| Ethyl Acetate | — | 60.0 |

[a]PAPI-580 (Dow Chemical Co.) methylene diisocyanate.
[b]"STEPANPOL" PS-2852 (Stepan Co.) aromatic polyester polyol.
[c]Catalyst/Surfactant
92.9% DC-193, silicone (Dow Corning Corp.)

TABLE IV-continued

250 Index Polyisocyanurate Resin

| Comment | Equivalent Wt., g. | Wt. Used, g. |
|---|---|---|

8.2% "HEX-CEM" 977, potassium octanoate (Mooney Chemicals, Inc.)
0.9% TMR-30, tris(dimethylaminomethyl) phenol (Air Products and Chemicals, Inc.)

TABLE V

Permeation Data
Polymer: 250 Index Polyisocyanurate Temperature: 25° C.

| Gas | Barrier Resin | Wt. % in Polyisocyanurate | Permeation Coefficient $cm^3$ gas at STP cm sec $cm^2$ (cm Hg) | Permeation Rate g./hr. | % Change In Permeation Rate |
|---|---|---|---|---|---|
| Nitrogen | None | — | $1.59 \times 10^{-11}$ | $3.69 \times 10^{-10}$ | — |
| Nitrogen | "ELVACITE" 2016 | 5.0 | $3.08 \times 10^{-12}$ | $7.17 \times 10^{-11}$ | −80.6 |

EXAMPLE 4

The solubility of several barrier resins was determined in HCFC-22, HCFC-123 and HCFC-141b. The data are summarized in Table VI.

TABLE VI

Solubility Data

| Barrier Resin | Solubility, Wt. % | | |
|---|---|---|---|
| | HCFC-22 | HCFC-123* | HCFC-141b |
| "ELVACITE" 2016 | >10 | >10 | >10 |
| "ELVAX" 40 | >10 | >10 | >10 |
| "VAMAC" G | >10 | >10 | >10 |

*Commercial grade; typically including up to about 10 percent HCFC-123a.

The chemicals used in the previous Examples and tests are identified structurally and by source as follows:

| Designation | Structure | Source |
|---|---|---|
| "SELAR" OH 3007 | Ethylene/vinyl alcohol copolymer | Du Pont Co. |
| "ELVAX" 40 | Ethylene/vinyl acetate copolymer | Du Pont Co. |
| "VAMAC" G | Ethylene/methyl acrylate copolymer | Du Pont Co. |
| Polymeric Acrylonitrile A-7 | Acrylonitrile/methyl acrylate copolymer | Du Pont Co. |
| "SOLEF" 1008-1001 | Polyvinylidene fluoride | Soltex Polymer Corp. |
| "ELVANOL" 90-50 | Polyvinyl alcohol | Du Pont Co. |
| "SARAN" 516 | Vinylidene chloride/vinylchloride copolymer | Dow Chem. |
| "ELVACITE" 2016 | Methyl/butyl methacrylate copolymer | Du Pont Co. |
| "SELAR" PA 3246 | POLYAMIDE(nylon) | Du Pont Co. |
| CFC-11 | Trichlorofluoromethane | Du Pont Co. |
| HCFC-22 | Chlorodifluoromethane | Du Pont Co. |
| HCFC-123 | 1,1,1-trifluoro-2,2-dichloroethane | Du Pont Co. |
| HCFC-123a | 1,1,2-trifluoro-1,2-dichloroethane | Du Pont Co. |
| HCFC-141b | 1-fluoro-1,1-dichloroethane | Du Pont Co. |

Having thus described and exemplified the invention with a certain degree of specificity, it should be appreciated that the following claims are not to be so limited but are to be afforded a scope commensurate with the wording of each element of the claims and equivalents thereof.

We claim:

1. In a closed cell thermoplastic or thermoset polymer foam characterized by a continuous polymeric phase and discontinuous gaseous phase, the improvement comprising: an effective amount of a gas barrier resin substantially uniformly dispersed in the continuous polymeric phase which reduces the permeability of the foam; thereby maintaining a blowing agent in the cells of the foam wherein said blowing agent comprises at least one member from the group consisting of HCFC-22, HCFC-142b, methyl formate, $C_3$ to $C_6$ hydrocarbons, HFC-143a, HFC-152, HFC-152a, $CO_2$, HFC-32, HFC-125, HFC-134, and HFC-134a, wherein said continuous polymeric phase comprises a material selected from the group consisting of polyurethanes, polyisocyanurates, and polystyrene, and; wherein said gas barrier resin comprises a material selected from the group consisting of:
   ethylene/vinyl alcohol copolymers;
   polyvinyl alcohol;
   polyacrylonitrile and copolymers;
   polyvinylidene fluoride;
   polyamides;
   admixtures of ethylene/vinyl alcohol copolymers and mica; and mixtures thereof.

2. An improved closed cell thermoplastic or thermoset polymer foam of claim 1 wherein said gas barrier resin is present in the range of from about 0.1 to about 20 weight percent of said foam.

3. An improved closed cell thermoplastic or thermoset polymer foam of claim 1 wherein said gaseous phase comprises a blowing agent gas selected from the group consisting of: $CFCl_3$; $CF_2Cl_2$; $CCl_2FCClF_2$; $CClF_2CClF_2$; $CHClF_2$; $CF_3CHCl_2$; $CClF_2CHClF$; $CF_3CHClF$; $CCl_2FCH_3$; $CClF_2CH_3$; $CH_2F_2$; $CF_3CHF_2$; $CHF_2CHF_2$; $CF_3CH_2F$; $CH_2FCH_2F$; $CF_3CH_3$; $CHF_2CH_3$; $CO_2$; $C_3$ to $C_6$ hydrocarbons; methyl formate; and mixtures thereof.

4. In a process for manufacturing an insulating closed-cell polymer foam wherein a blowing agent is admixed with a molten thermoplastic or a liquid thermoset resin precursor and allowed to expand forming a polymer foam as the polymeric phase solidifies, the improvement comprising the step of: dispersing in said molten thermoplastic or liquid thermoset resin precursor an effective amount of a gas barrier resin, prior to expansion, such that said gas barrier resin is substantially uniformly dispersed in the resulting polymeric phase of the polymer foam, wherein the gas barrier resin reduces the gas permeability of the polymer foam; wherein said blowing agent comprises at least one member from the group consisting of HCFC-22, HCFC-142b, methyl formate, $C_3$ to $C_6$ hydrocarbons, HFC-143a, HFC-152, HFC-152a, $CO_2$, HFC-32, HFC-125, HFC-134, and HFC134a, wherein said polymeric phase comprises a material selected from the group consisting of polyurethanes, polyisocyanurates, and polystyrene said gas barrier resin comprises a material selected from the group consisting of:

ethylene/vinyl alcohol copolymers;

polyvinyl alcohol;

polyacrylonitrile and copolymers;

polyvinylidene fluoride;

polyamides;

admixtures of ethylene/vinyl alcohol copolymers and mica; and mixtures thereof, and;

wherein said gas barrier resin agent is present in the range of from about 0.1 to about 20 weight percent of said foam.

5. In a closed cell thermoplastic or thermoset polymer foam characterized by a continuous polymeric phase and discontinuous gaseous phase, the improvement comprising:

(a) a gaseous phase comprising at least one blowing agent;

(b) a continuous polymeric phase comprising a material selected from the group consisting of: polyurethanes, polyisocyanurates, and polystyrene; and (c) an effective amount of a gas barrier resin substantially uniformly dispersed in the continuous polymeric phase, which reduces the permeability of the foam; thereby maintaining said blowing agent, which has a lower vapor thermal conductivity than air, in the cells of the foam, wherein said blowing agent comprises at least one member from the group consisting of HCFC-22, HCFC-142b, methyl formate, $C_3$ to $C_6$ hydrocarbons, HFC-143a, HFC-152, HFC-152a, $CO_2$, HFC-32, HFC-125, HFC-134, and HFC-134a, wherein said gas barrier resin comprises at least one material selected from the group consisting of:

ethylene/vinyl alcohol copolymers;
polyvinyl alcohol;
polyacrylonitrile and copolymers;
polyvinylidene fluoride;
polyamides;
admixtures of ethylene/vinyl alcohol copolymers and mica; and mixtures thereof.

6. An improved closed cell thermoplastic or thermoset polymer foam of claim 5 wherein said gaseous phase comprises a blowing agent gas selected from the group consisting of: $CFCl_3$; $CF_2Cl_2$; $CCl_2FCClF_2$; $CClF_2CClF_2$; $CHClF_2$; $CF_3CHCl_2$; $CClF_2CHClF$; $CF_3CHClF$; $CCl_2FCH_3$; $CClF_2CH_3$; $CH_2F_2$; $CF_3CHF_2$;; $CHF_2CHF_2$; $CF_3CH_2F$; $CH_2FCH_2F$; $CF_3CH_3$; $CHF_2CH_3$; $CO_2$; $C_3$ to $C_6$ hydrocarbons; methyl formate; and mixtures thereof.

7. An improved thermoplastic or thermoset closed-cell polymer composition comprising:

(a) a polymer; and (b) an effective amount of a gas barrier resin uniformly dispersed in said polymer resin to reduce the permeation of the gas comprising the blowing agent, wherein said gas barrier resin comprises a material selected from the group consisting of:
ethylene/vinyl alcohol copolymers;
polyvinyl alcohol;
polyacrylonitrile and copolymers;
polyvinylidene fluoride;
polyamides;
admixtures of ethylene/vinyl alcohol copolymers and mica; and mixtures thereof, and;
wherein said gas barrier resin agent is present in the range of from about 0.1 to about 20 weight percent of said foam, said blowing agent having a vapor thermal conductivity which is lower than air, through the foam made using said improved thermoplastic of thermoset polymer composition wherein said blowing agent comprises at least one member from the group consisting of HCFC-22, HCFC-142b, methyl formate, $C_3$ to $C_6$ hydrocarbons, HFC-143a, HFC-152, HFC-152a, $CO_2$, HFC-32, HFC-125, HFC-134, and HFC-134a, wherein said polymer comprises a material selected from the group consisting of: polyurethanes, polyisocyanurates, and polystyrene.

8. An improved intermediate for a closed-cell polymer foam composition comprising:

(a) a polyol or an isocyanate; and (b) an effective amount of a gas barrier resin uniformly dispersed in said polyol, or an isocyanate to reduce the permeation of gas through a foam made using said improved intermediate composition, wherein said gas barrier resin comprises a material selected from the group consisting of:
ethylene/vinyl alcohol copolymers;
polyvinyl alcohol;
polyacrylonitrile and copolymers;
polyvinylidene fluoride;
polyamides;
admixtures of ethylene/vinyl alcohol copolymers and mica; and mixtures thereof, and; wherein said gas barrier resin agent is present in the range of from about 0.1 to about 20 weight percent of said foam.

9. An improved foaming composition comprising:

(a) at least one blowing agent; and (b) an effective amount of a gas barrier resin admixed in said blowing agent to reduce the permeation of gas through a closed-cell polymer foam made using said improved foaming composition, wherein said continuous polymeric phase comprises a material selected from the group consisting of polyurethanes, polyisocyanurates, and polystyrene, and; wherein said gas barrier resin comprises a material selected from the group consisting of:
ethylene/vinyl alcohol copolymers;
polyvinyl alcohol;
polyacrylonitrile and copolymers;
polyvinylidene fluoride;
polyamides;
admixtures of ethylene/vinyl alcohol copolymers and mica; and mixtures thereof.

10. The foam of claim 1 or 5 wherein said blowing agent comprises HFC-134a.

11. The foam of claim 1 or 5 wherein said blowing agent comprises HFC-152a.

12. The process of claim 4 wherein said blowing agent comprises HFC-134a.

13. The process of claim 4 wherein said blowing agent comprises HFC-152a.

14. The foam of claim 1 or 5 wherein said blowing agent comprises 1,1,2,2-Tetrafluoroethane.

15. The process of claim 4 wherein said blowing agent comprises 1,1,2,2-Tetrafluoroethane.

* * * * *